United States Patent [19]

Poynter

[11] 3,908,937
[45] Sept. 30, 1975

[54] PARACHUTE PACK
[75] Inventor: Daniel F. Poynter, North Quincy, Mass.
[73] Assignee: Strong Enterprises, Inc., North Quincy, Mass.
[22] Filed: Oct. 31, 1973
[21] Appl. No.: 411,488

[52] U.S. Cl. ................................. 244/148
[51] Int. Cl.² ......................... B64D 17/40
[58] Field of Search ........... 244/148, 147, 149, 142

[56] References Cited
UNITED STATES PATENTS
| | | | |
|---|---|---|---|
| 2,299,407 | 10/1942 | Quilter | 244/149 |
| 2,682,382 | 6/1954 | Barnes | 244/148 |
| 2,711,869 | 6/1955 | Carroll | 244/148 |
| 2,869,809 | 1/1959 | Gregory | 244/148 |

*Primary Examiner*—Trygve M. Blix
*Assistant Examiner*—Barry L. Kelmachter
*Attorney, Agent, or Firm*—Weingarten, Maxham & Schurgin

[57] ABSTRACT

A parachute pack having, when packed, a slim flexible profile for improved free-fall aerodynamics, an externally mounted pilot chute with a release mechanism located to the rear of the pack to protect against accidental opening and a canopy accordion packed and compartmented into separate pack portions to provide more orderly and safe deployment of the canopy and associated lines.

17 Claims, 5 Drawing Figures

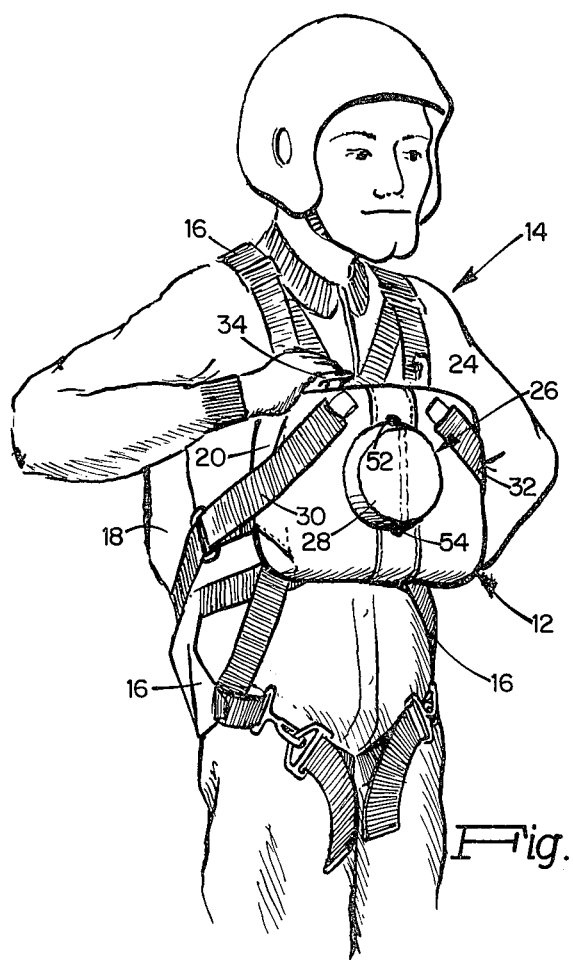
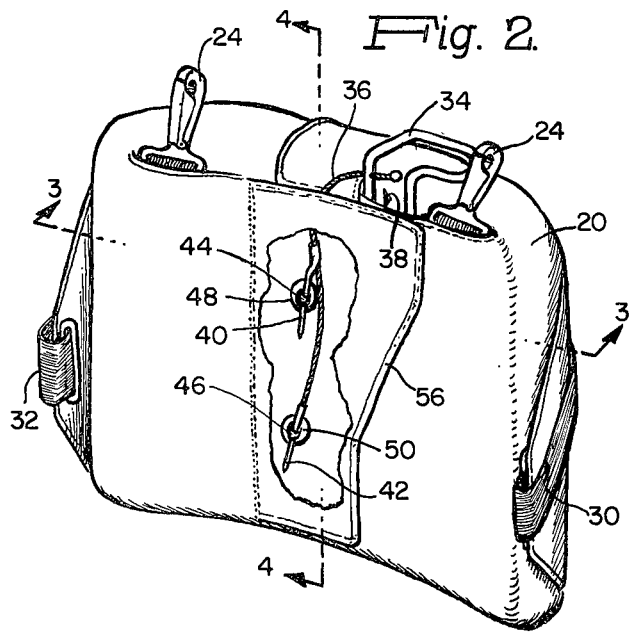
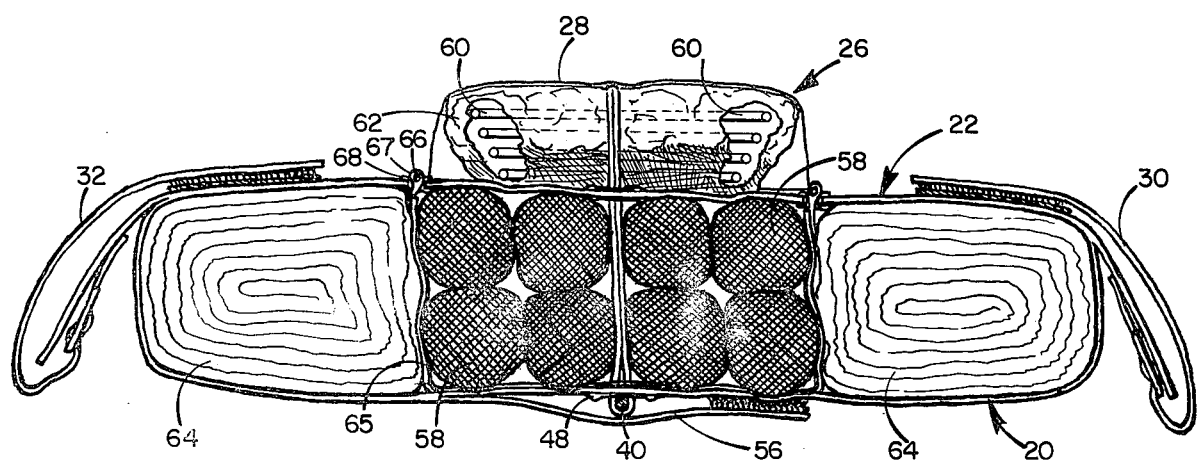

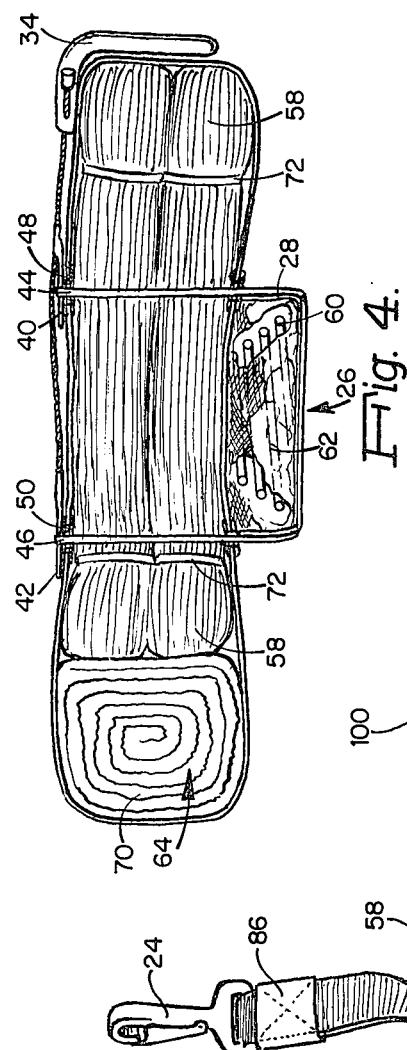
Fig. 4.
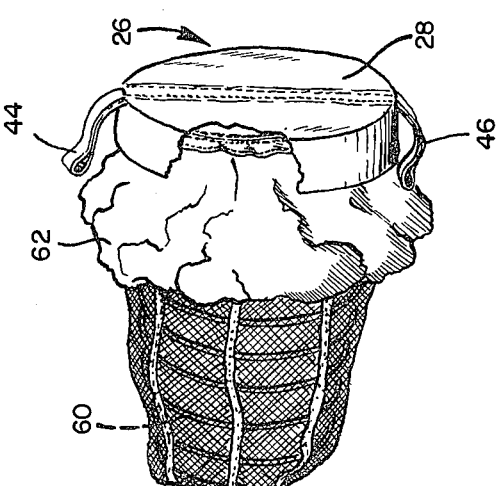
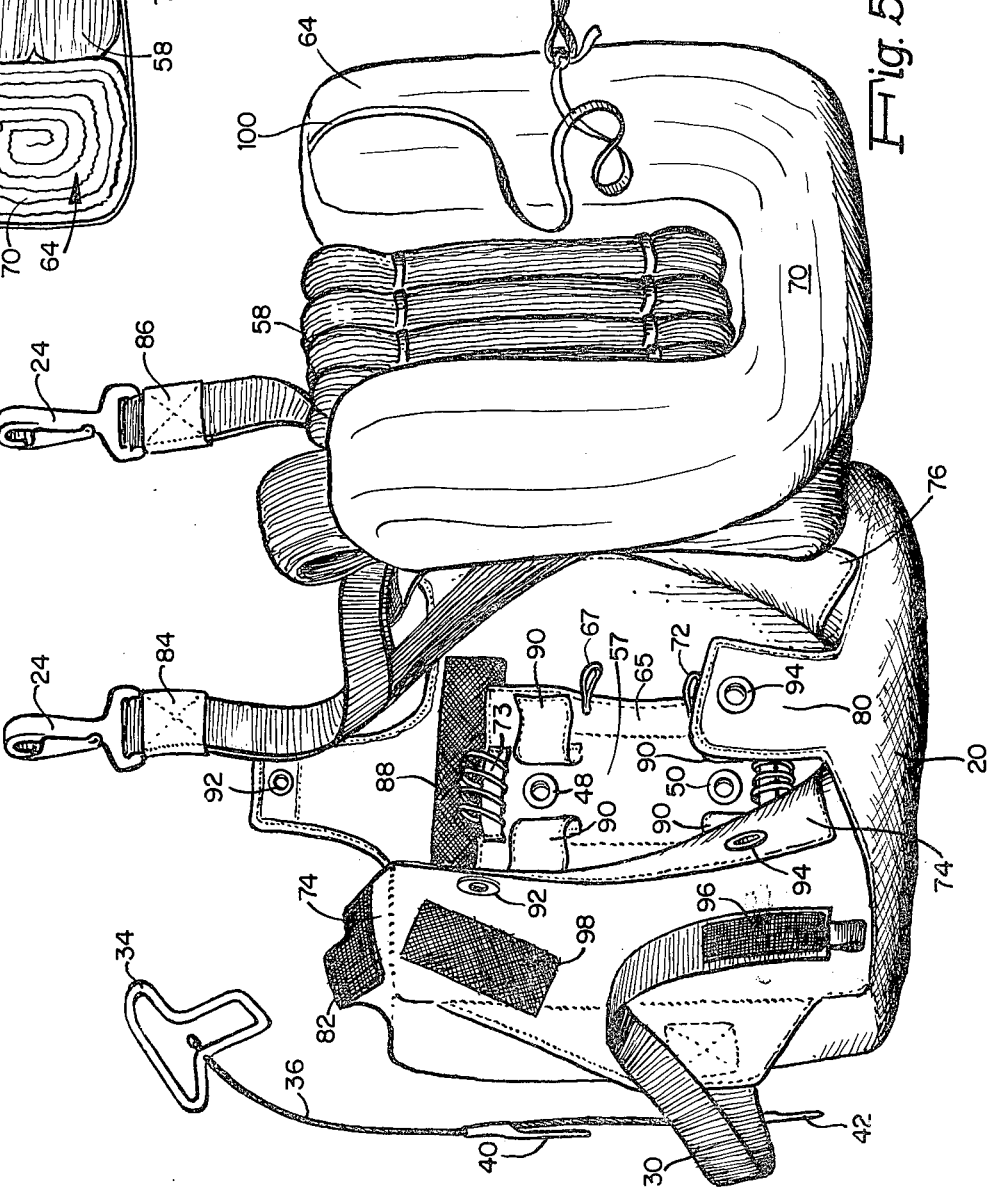
Fig. 5.

PARACHUTE PACK

FIELD OF THE INVENTION

This invention relates to parachute packs and in particular to a more aerodynamic parachute pack with improved parachute deployment safety and comfort characteristics.

BACKGROUND OF THE INVENTION

The parachute is a generally bulky and awkwardly worn device and many attempts have been made to improve its carriability consistent with maintaining the reliability of its primary purpose, which is proper deployment and opening to slow the descent of the user. Particularly with reserve parachutes normally carried on a parachutist's chest as the all important safety chute and under-the-seat parachutes employed as the sole parachute by civilian or military pilots, there is a special need to make the parachute deploying mechanism of utmost reliability and the parachute pack as unobtrusive as possible to provide great safety and confidence and to reduce parachute interference with operator performance.

In both reserve and under-the-seat applications, it is important that the ripcord release for the pilot chute be secured against accidental damage or release. In the case of the sport parachutist, not only would such damage or premature release eliminate the second line of safety, but if improperly deployed could interfere with the operation of the main chute. Also, in military applications where a single chute is the common practice, it is highly important to provide as near complete reliability in parachute operation as is possible to insure that the parachute will be ready to operate when needed.

In sport parachuting, the interference of the reserve parachute with the competitive maneuvers of the parachutist should be minimized. To this end, an aerodynamically streamlined form for the reserve parachute pack would be advantageous as well as a pack design which renders the pack flexible to conform to body motions of the parachutist particularly during free-fall maneuvers. The same pack design requirements would be advantageous for the pilot to permit a more comfortable pack to sit upon without the usual pack frame protrusions.

In conventional parachute pack designs, typically for reserve parachutes, the packed configuration of the parachute canopy and associated lines in association with the release mechanism for the pilot chute typically result in a "dumping" of the entire bundle of canopy and lines when the ripcord release is pulled. Such an uncontrolled "dumping" of the packed chute increases the probabilities of tangling of the parachute systems or other disorders resulting in its failure to open or open properly. It would be advantageous, therefore, to provide a parachute pack and packing configuration which promotes a more orderly release and deployment of the parachute canopy and associated lines to lower the tangling probability without sacrificing reliability of pack opening.

BRIEF SUMMARY OF THE INVENTION

In providing these and other features in a parachute pack, the preferred embodiment of the present invention contemplates a parachute pack design typically, though not necessarily, for use as a reserve parachute pack or under-the-seat pack and having a thin and flexible, rectangular profile for improved aerodynamics and seating comfort, a pilot chute release mechanism of improved efficiency and a canopy and line packing and opening configuration which promotes a staged and controlled deploying.

The parachute lines are releasably stowed within a central portion of the rectangular parachute pack to provide a firm bed against which the compressed spring of the pilot parachute pushes. The pilot chute and compressed spring are externally mounted on the parachute pack away from the user's body and retained in a nearly flush condition to the surface of the pack by a plurality of cords which are fed through the parachute pack in fabric channels to be secured at the rear of the parachute pack by corresponding ripcord pins. This design provides greater security against accidental release mechanism activation or damage, as well as improves flexibility in ripcord handle placement. Additionally, the external mounting of the pilot chute improves the reliability of its release in conjunction with the firm bed of coiled lines for its compressed spring. With this structure, the pilot chute cannot become caught within the pack or entangled in the canopy. A cover for the externally mounted pilot chute permits dressing of the chute material under the cover to prevent it becoming entangled or torn by foreign objects.

The parachute canopy is accordion folded and formed in the parachute pack peripherally of the central portion containing the stowed lines to fill the edges of the rectangular pack. This configuration, in association with a front pack closure concept employing a plurality of flaps secured by a releasable fastener promotes a controlled deployment of the parachute canopy in an unfolding motion through a central pack opening as opposed to a dumping of the complete canopy out of one side of the pack. This controlled release of the canopy and associated lines promotes a smoother, more reliable deployment and opening of the parachute.

BRIEF DESCRIPTION OF THE DRAWINGS

These and other features of the invention will be described in greater specificity below in the detailed description of the preferred embodiment and in the associated drawings of which:

FIG. 1 is a pictorial view of the parachute pack of the present invention as worn by a parachutist;

FIG. 2 is a rear pictorial, partially cutaway view illustrating certain features of the preferred embodiment of the present invention;

FIG. 3 is an interior cutaway view of a portion of the parachute pack of the present invention further illustrating its features;

FIG. 4 is a further interior cutaway view of the parachute pack along a plane orthogonal to the plane of view in FIG. 3; and FIG. 5 is an exploded view of the parachute pack of the present invention showing the pack and pack contents.

DETAILED DESCRIPTION OF THE PREFERRED EMBODIMENT

In the preferred embodiment of the present invention, a parachute pack is contemplated which has a streamlined aerodynamic shape and increased pack flexibility to facilitate freefall maneuvers, and an externally mounted rear release pilot chute which cooperates with a particular parachute packing and pack opening concept for increased reliability and smoother parachute deployment. With particular reference to FIG. 1, a pictorial view of a pack 12 according to the preferred embodiment is shown as it might typically be worn by a sport parachutist 14. The parachute 12 is shown as typically a reserve parachute which is attached to the front of the parachutist 14 through a harness system 16. A back carried, main parachute 18 will also preferably be attached to the harness 16. The parachute 12 as shown in FIG. 1 comprises a relatively thin rectangular-shaped pack 20 which has a series of flaps to be described below forming a front surface 22. The pack 20 contains within it the reserve parachute canopy and associated lines which terminate in snap hooks 24 that are secured for break away on opening to the harness 16 so as to support the parachutist 14 from the reserve canopy when open. The pack 20 is preferably a fabric container without a rigid frame extending the length of the pack to impart to the pack flexibility in conforming to the body of the wearer 14, particularly during free-fall maneuvers. Prior reserve packs have suffered from the presence of a rigid frame throughout the back of the pack.

The pack 20 has left- and right-hand lateral straps 30 and 32 which are secured to the front of the pack 22 through a releasable attachment such as a nylon hook and pile tape fastener known in the trade as VELCRO after encircling loops on the main parachute pack 18. The straps 30 and 32 are designed to generally retain relative positions of the packs 18 and 20 on the harness 16 when worn and after deployment and opening of the reserve parachute contained within the pack 20.

With reference now to FIG. 2, the release mechanism for the pilot chute 26 is illustrated as comprising a ripcord cable 36 extending from a handle 34 which is inserted into a pocket 38 of the pack 20. The cord 36 communicates with first and second pins 40 and 42 which are inserted through loops on cords 44 and 46 which protrude through grommets 48 and 50. The cords 44 and 46 pass through the interior of the pack 20 to opposing sides 52 and 54 of the pilot chute 26 and thereby secure it to the front of the pack 20 with its spring in a fully compressed condition. The region of the ripcord 36 where the pins 40 and 42 loop with the cords 44 and 46 is protected by a flap 56 secured to the main portion of the pack 20 through a detachable adhesive such as VELCRO. This release system can thus be fully protected because the pack does not need to open where the pins are released. Preferably, a narrow, vertically extending stiffening plate is sewn into the back of the pack in the region of grommets 48 and 50. Stiffening plate 57 is shown in FIG. 5. A pilot chute 26 is externally mounted on the parachute pack 12 and has a cover 28 sewn about the top of the pilot chute 26 to permit dressing of the compressed pilot chute material under the cover 28 to prevent the pilot chute from becoming entangled in or torn by foreign objects.

The details of this release mechanism are additionally indicated in FIG. 3 which is an interior view of the pack 20 along the section lines indicated in FIG. 2. In FIG. 3, the parachute lines 58 are indicated as stowed and secured for release within a central interior portion of the pack 20 directly between the pilot chute 26 and plate 57 under the rear flap 56. A spring 60, typically fourteen inches in length in uncompressed form, is a part of the pilot chute 26 and has the pilot chute canopy 62 disposed therearound. In packed form, the spring 60 is compressed to a small fraction of its total uncompressed length against the front surface 22 of pack 20 backed up by the lines 58 and plate 57, and retained in that position by the lines 44 and 46 which lines are shown in FIG. 4. The lines 44 and 46 are secured at the rear of the pack 20 by the pins 40 and 42 of which the pin 40 is shown in FIG. 3. The lines 58 covered by surface 22 provide a solid bed for the coils of the compressed spring 60 to not only give a more solid platform for the spring to thrust against but minimizes the danger of the spring slipping to one side or another and weakening its release force.

The canopy 64 attached to the lines 58 is folded into the edges of the pack to either side of the central portion containing the lines 58. To facilitate packing, fabric partitions 65 extend from the rear of the pack to the front where loops 67 extend through grommets 68 to be secured by temporary pins 66. Flaps 65 separate lines 58 from canopy 64.

The left- and right-hand sections of the canopy 64 shown in FIG. 3 comprise accordion folds of respective top and bottom portions of the canopy. The pack area 70 shown in FIG. 4 receives a central portion between the top and bottom folds. As shown in FIG. 4, the parachute lines 58 are typically secured by sets of rubber bands 72 through straps 73 (FIG. 5) on the back of the pack 20.

Upon release of the parachute initiated by pulling of the ripcord handle 34 to extract the pins 40 and 42 from the loops of the cords 44 and 46, the cords 44 and 46 are rapidly drawn through the grommets 48 and 50 on the rear of the pack and through fabric channels, shown below, between the stowed lines 58 by the compressed force of the spring 60 urged against the surface 22 and stowed lines 58. In this manner, the pilot chute 26 is propelled outward from the front 22 of the pack 20 with no chance of entangling in the canopy or lines within the pack.

In FIG. 5, the components of the packed parachute are illustrated in separated form for clarity of understanding the various components of the packed parachute system. The pack 20 is shown to have right- and left-hand lateral flaps 74 and 76, as well as top and bottom flaps 78 and 80. Top flap 82 on flap 74 and a corresponding top flap 83, not shown, on flap 76 on the opposite side cover portions 84 and 86 of the canopy lines 58 leading from the snap hooks 24 and are secured after folding over the lines 84 and 86 to an adhesive strip 88 of typically VELCRO.

When packing the parachute pack, the lines 58 are first laid into the central portion and secured by the rubber bands 72 using partition flaps 65. Fabric flaps 90 which border the grommets 50 and 52 on the rear of the pack are carefully brought through the lines 58 when packing to maintain a clear channel through the lines to the grommets 50 and 52. Subsequently, the canopy 64 is accordion folded first on one side and then the other side (using either back-to-front or side-to-side folds) of packed lines 58 until it is completely enclosed by the pack 20. The flaps 74 and 76 are then closed and secured by flaps 82 and 83 over the packed lines and canopy followed by the flaps 78 and 80. Grommets 92 in the flaps 74, 76 and 78 and grommets 94 in the flaps 74, 76 and 80 are brought into alignment and the respective cords 44 and 46 in the pilot chute 26 are fed through the aligned grommets 92 and 94 respectively, through the channels defined by the fabric flaps 90, and through the rear grommets 50 and 52, respectively. This operation may be facilitated by employing an additional length of cord or draw bar which is first inserted through the grommets and channels from the rear to loop with cords 44 and 46 to permit drawing of these cords 44 and 46 through the pack 20, and pulling of the pilot chute 26 against the surface 22 and central portion having the lines 58. The spring 60 is thus compressed until the cords 44 and 46 extend through the grommets 50 and 52 to enable inserting of the pins 40 and 42 through the loops in the cords 44 and 46. At this point, the parachute is packed and ready for use.

The snap hooks 24 may be sewn or otherwise attached to portions of the pack 20 where they exit under the flaps 82. Similarly, the straps 30 and 32 will typically engage rings of the wearer's main parachute pack and be secured by VELCRO strips 96 and 98 to flaps 74 and 76. These help to keep the pack 20 positioned on the harness before and after deployment of the parachute in the embodiment of a reserve parachute.

When the parachute is deployed, as indicated above, the pilot chute 26 will be propelled forward and catch in the air streaming past the parachutist. At this point, the canopy will still be stowed and not dumped in the air stream. The stowed canopy 64 is withdrawn and unfolded from the pack by the pilot chute 26 and attachment cord 100. The canopy 64 unstows out of the pack 20 and urges the flaps 74, 76, 78, 80, 82 and 83 open in the process to define a central upper exit path. No elastics are employed to immediately open the flaps 74, 76, 78 and 80, other than the unstowing pressure of the canopy 64. This, in conjunction with the folded and compartmentalized packing of the canopy 64, facilitates its controlled deployment for smoother opening and less danger of tangling, snarling or dumping. The pilot chute 26 and the withdrawn canopy 64 are followed by the lines 58 which are urged from their elastic band restraints 72 by the additional air friction of the canopy 64 and pilot chute 26. It may be desired to add additional securing lines for the ripcord and handle 34 so that it is not lost during release of the parachute.

The fabric employed for the pack 20 and associated flaps and straps may be a heavy duty Nylon or Dacron or any other heavy, resilient material. The pilot chute 26, canopy 64 and lines 58 may be of conventional design, as well as the snap hooks 24 and ripcord 36 and handle 34.

While the exemplary preferred embodiment described above has been for a reserved parachute, the concept of the present invention finds equal utility as a civilian or military pilot parachute typically worn below the seat with the pilot chute 26 protruding downward. It is also possible to employ the concept of the present invention for a main parachute pack typically worn on the parachutist's back. Additional alterations and modifications of the preferred embodiment described above will occur to those skilled in the art. Accordingly, it is intended to limit the scope of the invention only as indicated in the following claims.

What is claimed is:

1. A container for a parachute canopy for release by an operator comprising:
    a pack generally fashioned to enclose a main parachute canopy and associated lines;
    a pilot chute for urging the canopy from said pack upon deployment of said pilot chute;
    means for propelling said pilot chute away from said pack;
    means for releasably securing said pilot chute against propulsion away from said pack in a position substantially external of said pack which position permits release of said pilot chute directly from the external position without obstruction;
    a cover for said pilot chute;
    means for securing said cover to said pilot chute whereby said cover travels with said pilot chute upon release of said pilot chute.

2. The parachute container of claim 1 wherein:
    a parachute canopy and associated lines are provided; and
    said pack includes means for receiving said lines in a substantially central portion directly interior of the point where said pilot chute is secured and for receiving said canopy in a folded compartmented configuration in locations about the portion having said lines.

3. The parachute container of claim 2 wherein said pack, containing said lines and said canopy, is of a generally flexible rectangular shape.

4. A container for a parachute canopy and associated lines comprising:
    a parachute pack formed to contain a parachute canopy and associated lines;
    a pilot chute for connection to the parachute canopy;
    means for releasing said pilot chute for ejection away from said parachute pack;
    means for securing said pilot chute to said releasing means;
    said securing means extending through said pack from one side to an opposite side whereby said pilot chute is positioned on one side of said parachute pack and said releasing means holds said securing means on the opposite side of said parachute pack.

5. The parachute container of claim 4 further including:
    means for defining a passage for said securing means through said parachute pack in isolation from the canopy and lines to be contained within said pack;
    said securing means including at least one cord from said pilot chute through said pack and the passage therethrough to said releasing means.

6. The parachute container of claim 5 wherein said releasing means includes a ripcord having at least a pin which restrains said at least one cord of said pilot chute on the side of said parachute pack opposite to the side having said pilot chute.

7. The parachute container of claim 5 wherein said means for defining passage through said parachute pack are disposed in the region adapted to contain the parachute lines;
    said parachute canopy being generally contained within said parachute pack in surrounding relationship to the region containing said lines and said passage defining means.

8. The parachute pack of claim 7 wherein said pilot chute includes a spring which is compressed against said parachute pack in the region of said lines when said cords are secured by the pins of said releasing means.

9. The parachute container of claim 5 wherein said parachute pack is of a generally flexible rectangular form.

10. A parachute system comprising:
a main parachute pack of generally flexible materials;
a main parachute canopy and associated lines;
means for securing said parachute lines in a generally central position in said parachute pack, the secured lines being secured for deployment;
said main parachute pack having said parachute canopy packed therein in generally peripheral relationship to the parachute lines;
a parachute pilot chute having resilient means for propelling said pilot chute away from said pack;
means for securing said pilot chute with its resilient means compressed against said lines substantially alone in said pack without generally compacting said parachute canopy; and,
means for releasing said pilot chute.

11. The parachute system of claim 10 wherein said parachute canopy is folded into lateral portions of said parachute pack whereby upon release of said pilot chute said parachute canopy is drawn from said parachute pack in a generally unfolding fashion.

12. The parachute system of claim 10 wherein said parachute pack includes:
a plurality of flaps;
means for detachably securing said parachute pack flaps to provide a generally closed parachute pack containing said parachute canopy and associated lines;
said detachable securing means being adapted to release said parachute canopy for unfolding thereof through an opening in said parachute pack provided by said flaps without dumping of said parachute canopy.

13. The parachute system of claim 10 wherein said parachute pack is of a generally flat aerodynamic shape.

14. The parachute system of claim 10 wherein said pilot chute is disposed external of said parachute pack.

15. A parachute system comprising:
a parachute pack of generally flexible fabric material adapted to define a generally thin rectangular form when packed to provide a free-fall aerodynamic shape;
a parachute canopy and associated lines;
means for stowing said parachute lines within said pack for deployment in a central portion of said pack;
said parachute canopy being contained within said pack for deployment in a folded configuration in lateral compartments about the portion containing said parachute lines whereby said parachute canopy and associated lines are displaced from one another in the plane defined by the rectangular shape of said pack;
a pilot chute secured to said canopy;
means for releasably securing said pilot chute external of said pack;
said securing means including:
at least one line leading from said pilot chute through said pack in the general region of said parachute lines through openings in the opposite side of said pack;
means for securing said lines for quick release at the side of said parachute pack opposite to the side having said pilot chute;
means for defining channels for said cords from said pilot chute through said parachute pack in the region of said parachute lines;
a plurality of flaps forming the surface of said parachute pack on the side of said pilot chute; and
means for securing said plurality of flaps to provide a substantial closed enclosure for said parachute canopy and associated lines by said parachute pack and for opening of said flaps by the action of said parachute canopy and associated lines deploying.

16. The parachute system of claim 15 further including:
means for segregating said lines and said canopy in said pack during packing thereof.

17. A container for a parachute canopy for release by an operator comprising:
a pack generally fashioned to enclose a parachute canopy and associated lines;
a pilot chute for urging the canopy from said pack upon deployment of said pilot chute;
means for propelling said pilot chute away from said pack;
means for releasably securing said pilot chute against propulsion away from said pack in a position substantially external of said pack; and
means for releasing said securing means whereby said pilot chute is propelled from said pack;
said securing means including means extending through said pack from said pilot chute to said releasing means and secured on the opposite side of said pack from said pilot chute by said releasing means.

* * * * *